(12) United States Patent
Shelford et al.

(10) Patent No.: US 6,221,381 B1
(45) Date of Patent: Apr. 24, 2001

(54) ENHANCING MILK PRODUCTION BY ADDING TO FEED A NONIONIC SURFACTANT COATED ON A CARRIER

(75) Inventors: James A. Shelford, Vancouver; George Kamande, Abbotsford, both of (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 09/404,971

(22) Filed: Sep. 24, 1999

Related U.S. Application Data

(63) Continuation-in-part of application No. 09/249,662, filed on Feb. 12, 1999, now abandoned, which is a continuation of application No. 08/872,654, filed on Jun. 10, 1997, now abandoned, which is a continuation of application No. 08/267,596, filed on Jun. 28, 1994, now abandoned.

(51) Int. Cl.⁷ .............................. A23K 1/17; A23K 1/18; A01M 63/00; C12M 9/14; C12N 1/20
(52) U.S. Cl. .................... 424/442; 424/93.4; 424/93.45; 424/94.6; 424/94.61; 426/2; 426/807; 435/195; 435/200; 435/252.9
(58) Field of Search .................................. 424/442, 93.4, 424/93.45, 94.6, 94.61; 426/2, 807; 435/195, 200, 252.9

(56) References Cited

U.S. PATENT DOCUMENTS 3,862,333   1/1975   Chalupa et al. ..................... 424/353

OTHER PUBLICATIONS

Muck, "Factors Influencing Silage Quality and Their Implications for Management," *J. Dairy Sci.* 71(11):2992–3002 (1988).

Kung et al., Effects of Plant Cell–Wall–Degrading Enzymes and Lactic Acid Bacterial on Silage Fermentation and Composition, *J. Dairy Sci.* 74(12):4284–4296 (1991).

Halle et al., "Effect of Surfactants on Cellulose Hydrolysis," *Biotechnology and Bioengineering* 42:611–617 (1993).

Ooshima et al., "Enhancement of Enzymatic Hydrolysis of Cellulose by Surfactant," *Biotechnology and Bioengineering* 28:1727–1734 (1986).

Madamwar et al., "Effects of Various Surfactants on Anaerobic Digestion of Water Hyacinth–Cattle Dung," *Bioresource Technology* 37:157–160 (1991).

Castanon et al., "Effects of the Surfactant Tween 80 on Enzymatic Hydrolysis of Neswspaper," *Biotechnology and Bioengineering* 23:1365–1372 (1981).

Jouany, "Methods of Manipulating the Microbial Metabolism in the Rumen," *Ann Zootech* 43:49–62 (1994).

*Primary Examiner*—David M. Naff
(74) *Attorney, Agent, or Firm*—Christensen O'Connor Johnson Kindness PLLC

(57) ABSTRACT

Methods and compositions are provided for enhancing feed utilization efficiency in a ruminant animal by adding to the feed a sufficient amount of a nonionic surfactant to enhance the utilization of the feed by the animal. The methods and compositions result in enhanced weight gain and/or milk production by the animal. Preferred nonionic surfactants include polyoxyethylenesorbitan monooleate and polyoxyethylenesorbitan trioleate at a concentration range of from about 0.01 to 1% (w/w) of the dry weight of the feed. A digestion enhancing enzyme and lactic acid bacteria inoculum may also be added to the feed. The surfactant is added to the feed by spraying a dilute solution of the surfactant onto the feed, or by coating the surfactant onto a particulate carrier such as celite, diatomaceous earth or silica and adding the carrier to the feed.

10 Claims, 6 Drawing Sheets

ENHANCING MILK PRODUCTION BY ADDING TO FEED A NONIONIC SURFACTANT COATED ON A CARRIER

This application is a continuation-in-part of application Ser. No. 09/249,662, filed Feb. 12, 1999, which is a continuation of application Ser. No. 08/872,654, filed Jun. 10, 1997, which is a continuation of application Ser. No. 08/267,596, filed Jun. 28, 1994, all now abandoned.

FIELD OF THE INVENTION

The present invention relates generally to ruminant feed compositions containing nonionic surfactants, either alone or in combination with digestion enhancing agents, and to methods for enhancing feedstock utilization efficiency in ruminant livestock. More particularly, this invention relates to the addition of nonionic surfactants to ruminant feed, with or without added digestion enhancing agents, and feeding the resulting product to the animal.

BACKGROUND OF THE INVENTION

Anaerobic fermentation occurs during ruminant digestion, during which proteins and carbohydrates are degraded. It is desirable in ruminant digestion to be able to control protease and carbohydrase activity to optimize the digestive process.

Since feed is a major cost in ruminant production, enhancing digestive efficiency remains a driving objective in the industry. Although forages remain the major feed source, it is widely believed that the efficiency of feed utilization by ruminants has remained relatively unchanged during the last two decades. New innovations that enhance the digestive efficiency provide a compromise to emerging environmental concerns regarding ground water pollution in most dairying areas. Nevertheless, an in depth understanding of the roles of feed processing and bacterial digestion are required to fully manipulate the digestive processes of the rumen. Cheng et al. ("Microbial ecology and physiology of feed degradation within the rumen," in Physiological aspects of digestion and metabolism in ruminants: Proceedings of the seventh international symposium on ruminant physiology, Tsuda, Ed., 1991) has identified the following three general factors as influencing microbial digestion of feeds: (a) plant structures that regulate bacterial access to nutrients; (b) microbial factors that control adhesion and the development of digestive microbial consortia; and (c) complexes of oriented hydrolytic enzymes of the adherent microorganisms. Feed processing practices, e.g., grinding, normally attempt to increase enzyme-substrate interaction by the exposition of susceptible substrate binding sites.

The manipulation of digestion within the rumen in order to increase the efficiency of feed utilization has been achieved through the use of exogenous enzymes (Feng et al., "Effect of enzyme additives on in situ and in vitro degradation of mature cool-season grass forage," *J. Anim. Sci.* 70 (Suppl. 1):309 (1996)), and such compounds as ionophore antibiotics, methane production inhibitors, inhibitors of proteolysis or deamination, and buffers (Jouany, "Methods of manipulating the microbial metabolism in the rumen," *Ann. Zootech.* 43:49–62 (1994)). The increased digestive efficiency realized through the use of these compounds is the result of major shifts in microbial fermentation pathways. For example, the selective use of antibiotics can alter the rumen microbial population and ultimately influence the end products of digestion. Antibiotics are, however, used only in meat producing animals because of the risk of antibiotic transfer to milk. Production responses of animals fed exogenous enzymes have been inconsistent. Exogenous enzymes have been shown to increase (Beauchemin et al., "Fibrolytic enzymes increase fiber digestibility and growth rate of steers fed dry forages," *Can. J. Anim. Sci.* 75:641–644 (1995)), to not affect (Perry et al., "Effects of supplemental enzymes on nitrogen balance, digestibility of energy and nutrients and on growth and feed efficiency of cattle," *J. Anim. Sci.* 25:760–764 (1966)), and even to decrease (Svozil et al., "Application of a cellulolytic preparation in nutrition of lambs" *Sbor. Ved. Praci. VUVZ Prhrelice* 22:69–78 (1989)) the growth performance of ruminants fed forage or concentrate-based diets. The inconsistency is partly due to the numerous enzyme preparations available, application methods, and their interaction with different types of diets.

Long-chain fatty acids and the halogen homologues of methane have been found to reduce methane production in the rumen (Van Nevel et al., "Manipulation of rumen fermentation," In: *The Rumen Microbial Ecosystem.*, Ed. P. N. Hobson. Elsevier Applied Science, London, pp. 387 et seq. (1988)). The reduction in methane production is usually associated with a decrease in deamination of amino acids, particularly, branched-chain amino acids and an increase in propionic acid production. The main limitation with the use of these additives is that rumen microbes are able to adapt and degrade them after about one month of treatment. Another disadvantage is that the beneficial effect appears to be consistent only in forage-based diets that favor methane production.

Buffers are mainly used under conditions where the feeding of high levels of grains can induce an active fermentation and cause excess production of acids within the rumen. They act by regulating and maintaining the pH at levels at which the cellulolytic microorganisms can be of maximum effectiveness (pH=6–7). The digestion of starch and proteins is generally decreased when buffers are fed, however, the effect on the digestion of cell wall carbohydrates is inconsistent (Jouany, "Methods of manipulating the microbial metabolism in the rumen," *Ann. Zootech.* 43:49–62 (1994)).

Surfactants have been used in the food processing industry as emulsifiers and extenders (Griffin et al., "Surface Active Agents," in *Handbook of Food Additives.*$2^{nd}$ Ed., T. E. Furia, Ed., CRC Press, New York, N.Y., p 397 et seq. (1972)) and also as cleaning agents. The most well known physicochemical property of surfactants is their interfacial activity when placed in solution. Their ability to align at the interfaces is a reflection of their tendency to assume the most energetically stable orientation. One type of nonionic surfactant, the polyoxyethylene sorbitan esters, are synthesized by the addition, via polymerization, of ethylene oxide to sorbitan fatty acid esters. These nonionic hydrophilic emulsifiers are very effective antistaling agents and are therefore used in a variety of bakery products. They are widely known as polysorbates. The effects of the polysorbate Tween 80 on the hydrolysis of newspaper was investigated by Castanon et al., "Effects of the surfactant Tween 80 on enzymatic hydrolysis of newspaper," *Biotechnol. & Bioeng.* 23:1365 (1981). However, the effects of nonionic surfactants on ruminant digestion have not heretofore been contemplated.

The present invention provides compositions and methods that utilize nonionic surfactants to optimize the digestive process in ruminant animals. The compositions and methods described in this invention enhance productivity of ruminant animals, reduce waste production and ultimately improve profitability.

SUMMARY OF THE INVENTION

The present invention provides new and surprising methods and compositions for enhancing feed utilization efficiency in ruminant animals, such as cattle, sheep, goats, deer, bison, water buffalo and camels. In particular, it has now been discovered that when nonionic surfactants are admixed in ruminant feedstuffs at a concentration of from about 0.01 to 1% (w/w) and the feedstuffs are fed to ruminants, significantly higher productivity can be expected from these animals. Higher productivity may be characterized by higher milk yield, increased rate of weight gain, higher efficiency in converting feed into body tissues or milk, and/or a reduction in manure production. No additional benefits are realized if excess amounts of the surfactant are admixed with the feedstuff. It has also been discovered that when nonionic surfactants at a concentration of from about 0.01 to 1% (w/w) are combined with digestive enzymes, such as glycanases, and admixed with ruminant feeds, ruminant animals consuming said feed have higher feed conversion efficiencies and productivity.

In other aspects, the present invention provides compositions and methods that modify fermentation within the rumen towards more propionic acid production at the expense of acetic acid. Less heat is produced during the metabolism of propionic acid in the animal compared to that produced during the metabolism of acetic acid. Therefore the methods and compositions of the invention may be used to mitigate the effect of heat stress in ruminant animals.

In yet other aspects, the present invention provides methods for incorporating surfactant into ruminant feedstuff that ensures even distribution of the surfactant in the feedstuffs in order to obtain consistent improvement in animal performance. This aspect of the invention extends to feed additives containing nonionic surfactants either alone or in combination with digestion enhancing agents in concentrations as specified in the present invention.

In one preferred embodiment of the present invention, a nonionic surfactant is diluted with water or a carrier such as celite, diatomaceous earth, or silica and admixed with the feed before feeding the feed to the animal. When diluted with water, the surfactant may be sprayed onto the feed while the feed is simultaneously being mixed to ensure even distribution of the surfactant in the entire feed material. The surfactant coats the surface of the feed to enhance attachment of enzymes and or bacteria once the animal consumes the feed material.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

In FIG. 3, ♦ represents the control, ■ represents Tween 80 at a concentration of 0.2% w/w plus 0.1% enzyme, and 5 represents Tween 80 at a concentration of 0.2% w/w;

In FIG. 4, ♦ represents the control, ■ represents Tween 80 at a concentration of 0.2% w/w plus 0.1% enzyme, and 5 represents Tween 80 at a concentration of 0.2% w/w;

In FIG. 5, ♦ represents the control, ■ represents Tween 80 at a concentration of 0.2% w/w plus 0.1% enzyme, and 5 represents Tween 80 at a concentration of 0.2% w/w;

In FIG. 6, ♦ represents the control, ■ represents Tween 80 at a concentration of 0.2% w/w plus 0.1% enzyme, and 5 represents Tween 80 at a concentration of 0.2% w/w;

In FIG. 7, ♦ represents the control, ■ represents Tween 80 at a concentration of 0.2% w/w plus 0.1% enzyme, and 5 represents Tween 80 at a concentration of 0.2% w/w;

In FIG. 8, ♦ represents the control, ■ represents Tween 80 at a concentration of 0.2% w/w, and 5 represents Tween 80 at a concentration of 0.3% w/w;

In FIG. 9, ♦ represents the control, ■ represents Tween 80 at a concentration of 0.2% w/w, and 5 represents Tween 80 at a concentration of 0.3% w/w.

DETAILED DESCRIPTION OF THE PREFERRED EMBODIMENT

Figure 1:
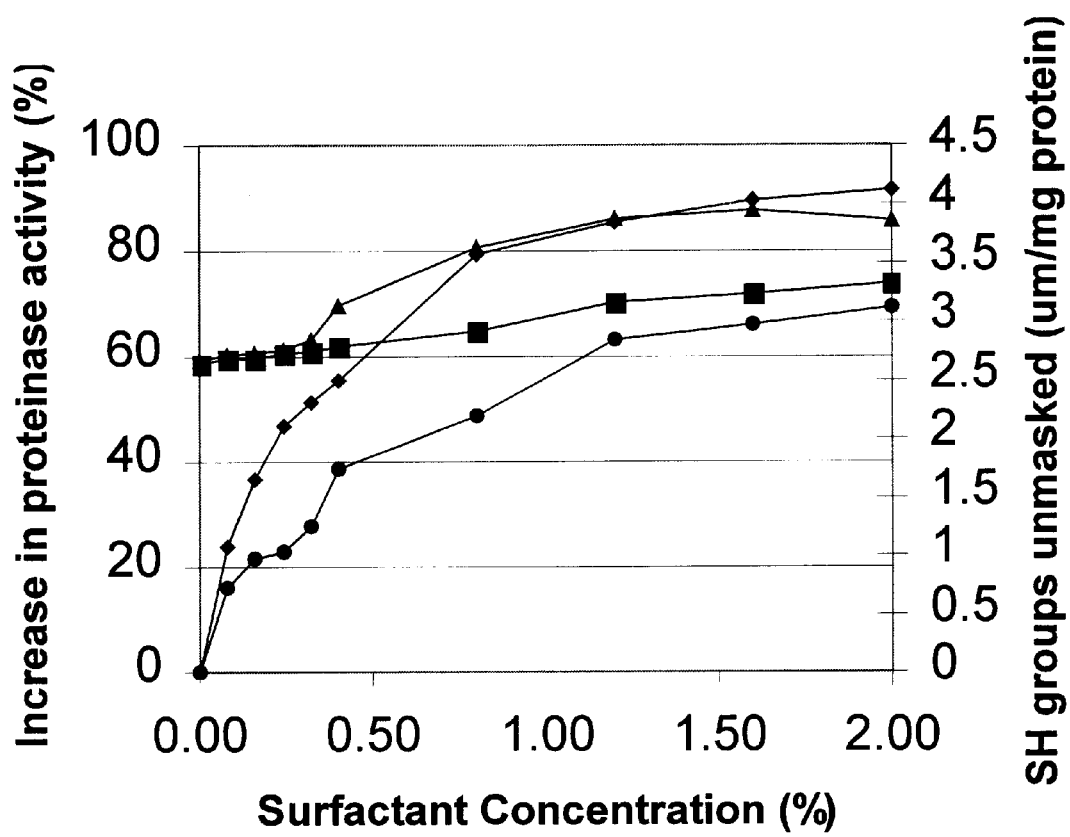
FIG. 1 is a graphical representation of the effect of the nonionic surfactants polyoxyethylenesorbitan monooleate (Tween 60, shown as "●" for protease activation (left axis) and "■" for SH unmasking (right axis)), and polyoxyethylenesorbitan trioleate (Tween 80, shown as "♦" for protease activation (left axis) and "5" for SH unmasking (right axis)) as described in Example 2.

According to one aspect of the present invention, methods and compositions are provided for enhancing feed utilization efficiency in ruminant animals, comprising adding to the feed a sufficient amount of a nonionic surfactant to enhance the utilization of the feed by the animal.

The term "feed efficiency" or "feed utilization" or "feed conversion" as used herein means the amount of feed needed to obtain a given amount of weight gain or milk production. In particular, feed efficiency or utilization expresses the efficiency by which an animal converts feed into weight gain or milk production. Feed efficiency is expressed as the ratio of weight of feed to weight gain (or milk production).

Although the terms "feed efficiency" and "weight gain" are often used together, there is a significant difference between the two as can be seen by the above definitions. Specifically, the determination of feed efficiency depends upon a given weight gain or milk production whereas the determination of weight gain or absolute milk production does not depend upon a given feed efficiency. The differences are especially significant to an animal producer or dairy farmer. In particular, weight gain or milk production can be achieved with little, no or even negative change in feed efficiency. Thus, for the animal producer, merely obtaining increases in weight gain or milk production may not necessarily be a more cost effective method for growth of the animal. While a producer looks at numerous factors in determining the cost of production, feed utilization efficiency is probably the most important and has the most impact on cost per pound of meat produced.

Thus, in one aspect of the invention, methods and compositions are provided for enhancing weight gain in a ruminant animal for a given amount of animal feed, comprising adding to the feed a sufficient amount of a nonionic surfactant to enhance the weight gain by the animal. In yet other aspects of the invention, methods and compositions are provided for enhancing milk production by a ruminant animal, comprising adding to the feed of the animal a sufficient amount of a nonionic surfactant to enhance milk production by the animal. In still other aspects of the invention, methods and compositions are provided for reducing the adverse effects of heat stress in a ruminant animal, comprising adding to the feed of the animal a sufficient amount of a nonionic surfactant to enhance feed utilization efficiency, enhance weight gain and/or enhance milk production by the animal.

As used herein, the term "ruminant" means an even-toed hoofed animal which has a complex 3- or 4-chambered stomach, and which is characterized by chewing again what it has already swallowed. Some examples of ruminants include cattle, sheep, goats, deer, bison, water buffalo and camels.

Surfactants include all surface active agents that are organic or organic-metal molecules that exhibit polar and solubility behavior that result in the phenomenon known as surface activity. The most commonly recognized phenomenon in this respect is the reduction of the boundary between two immiscible fluids. Surfactants include surface active agents which act as emulsifiers, wetting agents, solubilizers, detergents, suspending agents, crystallization modifiers (both aqueous and non aqueous) complexing agents and in other ways. The surfactants most useful in the practice of the present invention are the nonionic surfactants, including, without limitation, polyoxyethylenesorbitan monooleate (Tween 60), polyoxyethylenesorbitan trioleate (Tween 80), polyoxyethylenesorbitan monostearate, alkyltrimethylammonium bromides, dodecyltrimethylammonium bromide, hexadecyltrimethylammonium bromide, mixed alkyltrimethylammonium bromide, tetradecyltrimethylammonium bromide, benzalkonium chloride, benzethonium chloride, benzyldimethyldodecylammonium bromide, benzyldimethylhexadecylammonium bromide, benzyltrimethylammonium chloride, benzyltrimethylammonium methoxide, cetylpyridinium bromide, cetylpyridinium chloride, cetyltributylphosphonium bromide, cetyltrimethylammonium bromide, decamethonium bromide, dimethyldioctadecylammonium bromide, methylbenzethonium chloride, methyl mixed trialkyl ammonium chloride, methyltrioctylammonium chloride, n,n',mb'-polyethylene(10)-n-tallow-1,3-diaminopropane and 4-picoline dodecyl sulfate. In the most preferred form of the invention, the nonionic surfactant is selected from the group consisting of polyoxyethylenesorbitan monooleate (Tween 60) and polyoxyethylenesorbitan trioleate (Tween 80).

The concentration of surfactant affects the physical and chemical properties of the surface of feed particles, and consequently, digestion of the feed particle. During our earlier investigations, we determined that the range of concentrations of surfactants that promote association of enzymes with feed particles is quite narrow. Insufficient concentrations of surfactant did not increase interaction between enzymes and feed particles, whereas excess amounts tended to mask the surface of the feed particles and impede enzyme attachment. For purposes of the present invention, effective amounts of nonionic surfactants and their derivatives are from about 0.01 to 1% (w/w) of the dry weight of the feed, preferably from 0.01 to 0.5% (w/w) of the dry weight of the feed, and most preferably from 0.01 to 0.3% (w/w) of the dry weight of the feed.

In one presently preferred embodiment of this invention, the nonionic surfactant is diluted with a suitable diluent that does not affect the physico-chemical properties of surfactant before admixing with feed for ease of application and to ensure that the surfactant is distributed evenly in the feed. Suitable diluents include, but are not limited to water, celite, diatomaceous earth, and silica.

Feedstuff or feed useful in the practice of the present invention includes forages and grain feeds, such as grass and legume forages, crop residues, cereal grains, legume by-products and other agricultural by-products. In situations where the resulting feed is to be processed or preserved, the feed may be treated with the surfactant and/or enzyme before processing or preservation. Processing may include drying, ensiling, chopping, pelleting, cubing or baling in the case of forages, and in the case of grains and legume seeds by rolling, tempering, grinding, cracking, popping, extruding, pelleting, cubing, micronizing, roasting, flaking, cooking and or exploding.

As used herein, "forages" include the cut aerial portion of a plant material, both monocotyledonous and dicotyledonous, used as animal feed. Examples include, without limitation, orchardgrass, timothy, tall fescue, ryegrass, alfalfa, sainfoin, clovers and vetches.

As used herein, "grain feeds," means the seeds of plants that are fed to ruminant animals and may or may not include the outer hull, pod or husk of the seed. Examples include, without limitation, corn, wheat, barley sorghum, triticale, rye, canola, and Soya beans.

The present invention may be combined with other feed processing techniques or preservation methods, and may be included either during processing or preservation. Other processing techniques useful in combination with the present invention include, but not limited to, drying, ensiling, chopping, grinding, pelleting, cubing or baling in the case of forages, and in the case of grains feeds and legume seeds by drying, rolling, tempering, grinding, cracking, popping, extruding, pelleting, cubing, micronizing, roasting, flaking, cooking and or exploding. Preservation may include, but not limited to ensiling and haymaking.

Surfactants and enzymes used in accordance with the present invention are available in either a liquid or powdered form. If a liquid is used, the surfactant may be sprayed "as is" onto the feed material or preferably diluted in the same or separate aqueous solutions before application. When provided as a nonionic surfactant coated on a solid, the surfactant preferably may constitute at least 50% of the dry weight of the product. If provided as a solid it may be applied to the feed material "as is" or preferably dissolved in water or aqueous solutions such as a buffer solution with a pH range from 4.5 to 7 before application.

The surfactant is then evenly applied to the feed material. The resulting feed can either be fed immediately to livestock or stored and fed at a later time. The resulting feed composition is effective for prolonged periods of time, such as for at least three years or longer depending on the nature of the feed composition, storage conditions and the like.

In addition to feed and a nonionic surfactant, the compositions of the invention may further comprise one or more additional agents that enhance the ruminant digestive processes. Such agents include, for example, pyrodoxal 5-phosphate, fumaric acid and its salts, sorbic acid and its salts, parabenzoic acid esters, benzoic acid, polydimethyl siloxane-polyethers, unsaturated alcohols, bentonite, proteolytic and/or carbohydrase enzymes, such as glycanase, hemicellase, cellulase, pectinase, xylanase and amylase, and lactic acid bacteria inoculants, such as those comprising *Lactobacillus casei, L. acidophilus, L. salivarius, L. corymiformis subsp coryniformis, L. curvatus, L. plantarum, L. brevis, L. buchneri, L. fermentum, L. viridescens, Pdiococcus acidilacti, P. cerevisiae, P. pentosaceus, Streptococcus faecalis, S. faecium, S. lactis, L. buchneri, L. fermentum, L. viridenscens, L. delbrueckiin, Leuconostoc cremoris, L. dextranicum, L. mesenteroides* or *L. citrovorum*. Where the surfactant is used in conjunction with exogenous glycanases, the method of producing feed compositions in the present invention is most effective when surfactant constitute on the order of about 0.01% of the dry weight of the feed. In situations where the surfactant is used without exogenous enzymes, the compositions are most effective when the surfactant concentration does not exceed about 0.2% of the dry weight of the feed.

EXAMPLE 1

Protease Activity and Adsorption
Animals, Feed and Rumen Fluid Collection

Two rumen-fistulated, nonlactating cows averaging 623±12.5 kg in weight were fed 5 kg dry matter (DM) of low quality timothy hay twice daily. About 2.5L of rumen fluid was collected through the fistula 4 hrs after the morning feeding at 07:00 hrs. Bulk feed particles were removed by sieving the fluid through a 0.5 mm strain. The fluid was then composited and then stored in a prewarmed (37° C.) thermal container.

Preparation of Rumen Mixed Microbial Cell and Enzyme Source

A microbial powder was prepared using the acetone-butanol extraction procedure outlined by Mahadevan et al., "Preparation of protease from mixed rumen microorganisms and its use for the in vitro determination of true protein in feedstuffs," *Can. J. Anim. Sci.* 67:55 (1987). About 500 g of this powder was prepared and stored at −20° C. Extraction of the proteases was accomplished by stirring 250 g of the powder with 1L of 4° C. cold water (for 1 hr) and then proceeding along Mahadevan's extraction procedure. Only extracts from the filtration with an XM-300 Amicon Filter, (approx. 300 000 molecular weight cutoff—under nitrogen gas), were made, washed twice with distilled water and the retentate freeze dried. This was referred to as the mixed microbial cell enzyme source. It was used in the protein adhesion tests and also in the parallel thiol and protease activity determinations.

Determination of Thiols and Protease Activity, and Bacterial Protein Adhesion

Ten grams of the mixed microbial cell enzyme was dissolved in 100 ml warm (37° C.) 0.1 M phosphate buffer, pH 6.8, and used as an enzyme inoculant. The assay matrix consisted of 1 ml enzyme source, 1 ml 2% casein solution, 1 ml 01 M phosphate buffer and 1 ml of either the relevant level of surfactant or an equivalent amount of buffer. Ten levels of the two surfactants, polyoxyethylene sorbitan monoleate (Tween 80) and polyoxyethylene sorbitan monastearate (Tween 60) were tested, viz 0, 0.08, 0.16, 0.24, 0.32, 0.4, 0.8, 1.2, 1.6, and, 2.0% surfactant in the assay mixture.

The protease activity incubations were performed in 50 ml plastic centrifuge tubes, at 37° C. and under a stream of carbon dioxide gas. After 1.5 hr, 1 ml of the assay mixture was removed for the determination of thiols (SH) and disulfides (SS) (Sasago et al., "Determination of sulfhydryl and disulfide groups in milk by p-chloromercuribenzoate-diathizone method," *J. Dairy Sci.* 46:1348–1351 (1963)). At the end of 2 hr incubation, the reaction was stopped with 1 ml of 15% TCA (trichloroacetic acid) solution, cooled to 4° C. under an icebath, and centrifuged at 10,000 for 10 min. The free amino acids in the supernatant were assayed using the ninhydrin method (Rosen, "a Modified Colorimetric Analysis For Amino Acids," *Arch. Biochim. Biophys.* 67:10 (1957)). The optimal surfactant inclusion level was calculated by direct linear plots on the assumption that the Michaellis-Menten equation applied.

For the cellulose adhesion tests, the microbial enzyme source was resuspended and tested for adhesion on to a cellulose substrate (barley straw, with 4% CP and ground through 0.5 mm sieve). Microbial adsorption was demonstrated by stirring, (120 strokes/min) at 30° C. 0.1 g of the straw in 5 ml of a bacterial cell-enzyme inoculum suspension, and then following the supernatant protein change with time. Readings were taken at 10, 20, 30, 60, and 120 min. At the end of the adsorption period, the assay contents were centrifuged at 2500 g max for 10 min to precipitate the solids, and the protein in the supernatant was precipitated out by 15% TCA solution and quantified by the Bicichoninic method (Smith et al., "Measurement of protein using bicinchonic acid," *Anal. Biochem.* 150:76 (1984)). The mother suspension contained 4.0 g of the lyophilized mixed bacteria and enzyme in 400 ml of 0.1 M phosphate buffer pH 6.8, with the following levels of surfactant (Tween-80); 0, 0.1, 0.25, and 0.5%.

EXAMPLE 2

In Vitro Protein and Cellulose Degradation
Preparation of Rumen Fluid Inoculum

A bacterial fraction, largely free of protozoa, was prepared for the fermentation assays by using the procedure of Forsberg, "Some Effects of Arsenic on the Rumen Microflora; An In Vitro Study," *Can. J. Microbiol.* 24:36 (1978). The digesta inoculum was resuspended and washed twice in an equivalent amount of 0.1 M phosphate buffer pH 6.8 to the rumen fluid. The inoculum provided both the substrate and the enzyme used for cellulose degradation assay. Incubation periods were 0, 1.5, 3, 6, 12, 24, and 48 hr. Other incubation conditions were similar to those outlined in experiment 1 above. However, cellulose was determined by the method of Updergraff, supra, for the in vivo digestibility trial. The optimal level of Tween 80 obtained was adopted here and followed.

In vivo Digestibility Trial

Four wethers weighing (72.5±15.0 kg) fitted with both rumen and duodenal cannula, were offered chopped medium quality timothy hay ad libitum. The hay was either sprayed with 500 ml water or 50 ml of Tween 80 dissolved in 500 ml of water. The feed was offered in two equal portions, at 08:30 and 20:30 hr. Water was available ad libitum. The experiment was designed as a 2×2 latin square with two 14-day adaptation, two 7-day collection periods.

Estimates of the rates of passage of the two treated hays were made using chromium mordanted fibre (Cr) for the particulate phase and cobalt-ethylene diaminetetracetic acid (Co-EDTA) for the liquid phase. The method of Uden et al., "Investigation of chromium, cerium and cobalt as markers in digesta: Rate of Passage studies," *J. Sci. of Food and Agriculture* 31:625–632 (1980), was used in the preparation of both markers.

The sheep were adapted to the feed in individual pens, and then moved into digestibility cages for total collection and marker infusion. During the collection period, records of feed intake, faecal and urine output were maintained. 250 g subsamples of the faeces were collected daily, subsampled for DM determination, while the rest was dried under a drought oven. Urine was collected under lN sulphuric acid.

On the last day of the collection period, each sheep was given 50 g of Cr-mordanted fibre 1 hr prior to the evening feeding. In addition, 250 ml of Co-EDTA (0.1 g/ml) was infused intraruminally and the animals were then fed. Rumen digesta and duodenal sampling commenced 4 hr after dosing and continued at the same interval for 96 hr.

Two samples of rumen fluid were collected: The first rumen fluid samples (30 ml) were preserved for microbial protein estimations by adding 7.5 ml of 0.9% NaCl in 37% formaldehyde solution. The samples were then stored at −20° C. after the preparation of a bacterial pellet by centrifugation at 27,000 g max for 15 min. A portion of the second rumen fluid and faecal samples was dried at 80° C. and ground in a coffee grinder (Braun, Inc. MA) for DM and Cr determination (Uden et al., 1980). Cr concentration in the samples was determined in duplicate by atomic absorption spectrophotometer (Perkin Elmer 560) using Cr standards (Fisher Scientific Co. N.J.). The rest of the second rumen fluid sample was centrifuged at 10,000 g max for 10 min and the supernatants analyzed directly for cobalt using 0.1N HCL as the blank. Standards were prepared using cobalt chloride (Fisher Scientific Co. N.J.). Marker concentrations were expressed per gram of dry sample.

Other analyses included: acid and neutral detergent fibre (Goering and Van Soest, "Forage fiber analysis," Agric. Handbook No. 379, p. 12 (1970)), total N (Parkinson and Allen, "A wet oxidation procedure suitable for the determination of nitrogen and mineral nutrients in biological materials," *Comm. Soil Sci. Plant Anal.* 6:1 (1975)) for RNA concentrations of the rumen bacterial pellets and duodenal samples.

Results

FIG. 1 shows the effect of Tween 60 and 80 on the activation of rumen microbial proteinases and the unmasking of the reactive cysteine (SH) groups. The initial rates of proteinase activation were, 163.5% (s.e. 14.69) and 98.04% (s.e. 0.13) control=0. The optimal surfactant inclusion level was calculated by direct linear plots on the assumption that the Michaelis-Menten equation applies. The concentration of additive required to achieve half the maximum velocity of the rumen enzyme, provided that the protein substrates were at saturating concentrations is given by the Km value. Vmax values represent the velocity of the enzyme reaction when all substrates are at saturating concentrations. The protease activation rate (Vmax) due to Tween 80 was significantly higher than that of Tween 60 (Table 1). Further the concentration (Km) of Tween 80 required to elucidate this effect was also significantly lower than in Tween 60.

TABLE 1

The apparent coefficients of proteinase activation and SH unmasking

|  | $Km^1$ | $Vmax^2$ |
|---|---|---|
| Proteinase activation | | |
| Tween 60 | 0.28 ± 0.02a | 99.2 ± 2.7a |
| Tween 80 | 0.20 ± 0.03b | 166.8 ± 8.9b |
| | Max. rate | |
| | ($\mu$mol SH/mg protein/ | |
| SH unmasking | % change in surfactant) | |
| Tween 60 | 0.30 ± 0.03a | |
| Tween 80 | 0.98 ± 0.29b | |

Column values followed by similar letters are not significantly different ($P < 0.05$).
[1]Additive conc. (%).
[2]Maximum proteinase activation (%/unit additive conc.).

The effect of either Tween 60 or 80 on rumen cellulase activity is depicted in

Figure 2:
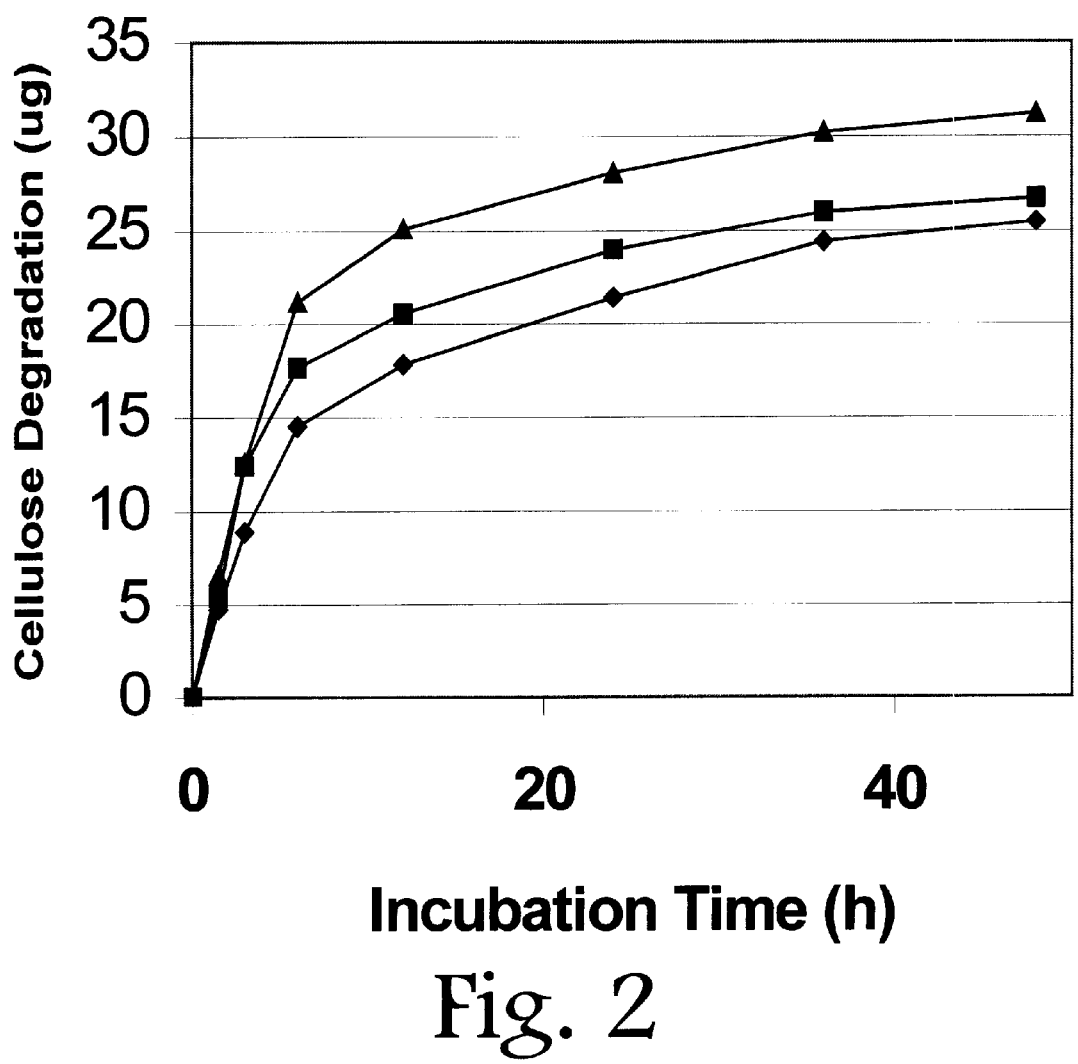
FIG. 2 is a graphical representation of the effect of the nonionic surfactants Tween 60 ("■") and Tween 80 (5) compared to control ("♦") on in vitro cellulose degradation as described in Example 2.

FIG. 2. 0.25% of either surfactant was used in the reaction mixture, based on the results in Table 1, (approximately Km value). The rates of cellulose breakdown calculated by regression analysis on the initial 24 hr incubation period are shown in Table 2. The results show that the addition of either surfactant increased the rate of cellulose breakdown significantly ($P<0.05$).

TABLE 2

Initial rates of cellulose degradation.

| Treatment | rate ($\mu$g/ml/hr) |
|---|---|
| no additive | 0.60a (0.21) |
| Tween 60 | 0.87b (0.28) |
| Tween 80 | 1.04c (0.32) |

Column values followed by similar letters are not significantly different ($P < 0.05$).
Bracketed values are standard errors.

Figure 3:
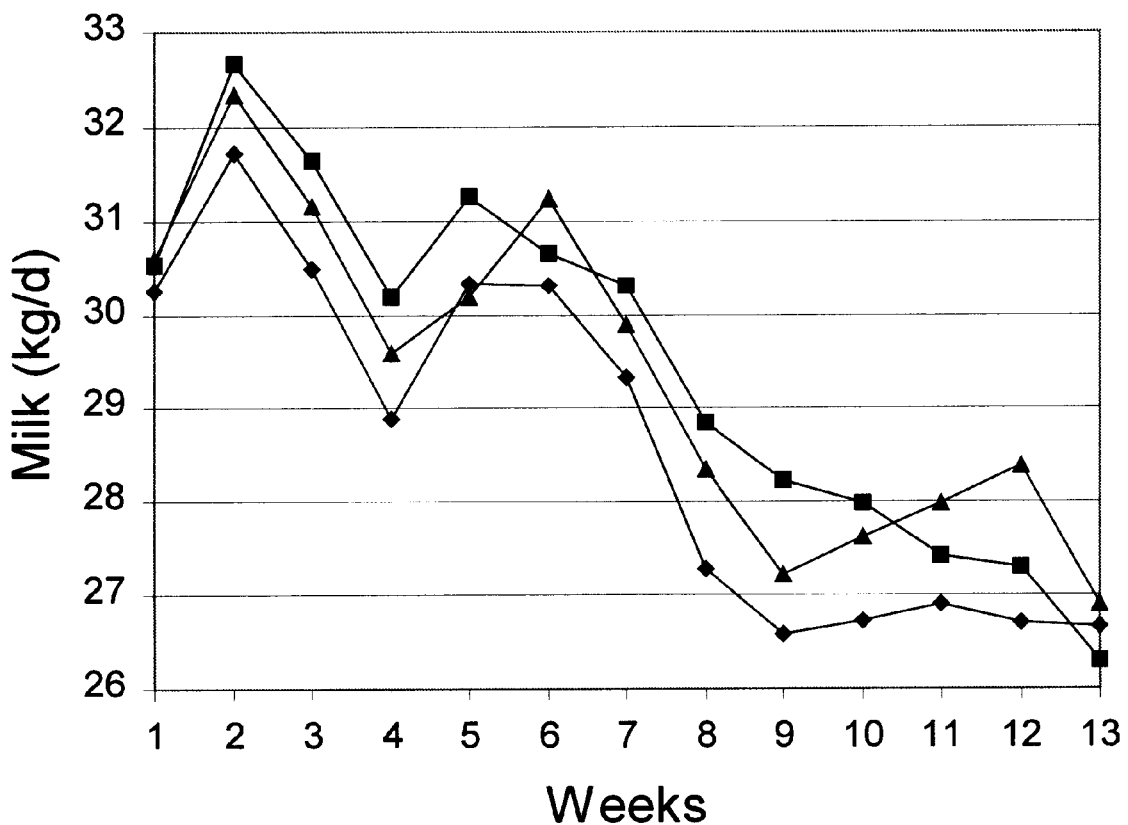
FIG. 3 is a graphical representation of the effect of the nonionic surfactant Tween 80 on milk production in dairy cows as described in Example 4.

FIG. 3 shows the effect of Tween 80 on rumen microbial cells enzyme source adsorption to barley straw over time. The addition of Tween 80 significantly ($P<0.05$) increased microbial protein adsorption levels greater than 0.1% did not alter either the rate or the extent of adsorption significantly ($P<0.05$), (Table 3). The effect of Tween 60 on microbial protein adsorption to ground straw was not determined.

TABLE 3

Coefficients of microbial protein adsorption to cereal straw

| | Microbial protein adsorption | |
|---|---|---|
| Additive level (%) | rate ($\mu$g/mg/min) | extent ($\mu$g/mg) |
| no additive | 0.026a (0.03) | 0.94a |
| 0.05% Tween 80 | 0.032b (0.01) | 1.12b |
| 0.10% Tween 80 | 0.034c (0.02) | 1.21c |
| 0.25% Tween 80 | 0.035c (0.01) | 1.18c |
| 0.50% Tween 80 | 0.034c (0.02) | 1.19c |

Column values followed by similar letters are not significantly different ($P < 0.05$).
Bracketed values are standard errors.

On the basis that the in vitro results showed a potential positive response to rumen digestibility, an in vivo trial was carried out. Table 4 shows the chemical composition of the hay used.

TABLE 4

Hay Composition (% by weight)

|  | % DM | % CP | % NDF | % ADF | % ASH |
|---|---|---|---|---|---|
| Hay | 0.82 | 11.8 | 68.3 | 33.85 | 3.4 |

Table 5 shows the digestibility coefficients of the two rations used in the in vivo trial. The concentration of Tween 80 in the hay ration was tested against a control.

TABLE 5

Intake and digestibility coefficients from the sheep trial.

|  | Control | Tween 80 |
|---|---|---|
| Intake[1] | 1.96a (0.2) | 2.06b (0.1) |
| Digestibility: |  |  |
| Dry matter (%) | 54.46a (0.7) | 64.70b (0.8) |
| Crude protein (%) | 52.44a (0.6) | 61.25b (0.5) |
| Acid detergent fibre (%) | 45.09a (0.5) | 52.68b (0.4) |
| Neutral detergent fibre (%) | 50.13a (0.7) | 60.63b (0.7) |

[1]expressed as a % of the body weight.
Values in a row followed by different letters are significantly different ($P < 0.05$).
Bracketed values are standard errors.

From FIG. 1, is evident that either of the two surfactants increased rumen bacterial proteinase activity significantly. In comparison with Tween 60, Tween 80 would have a higher solubilizing capacity as a result of its slightly higher hydrophile-lipophile balance (HLB). The HLB for Tween 60 and Tween 80 are 14.9 and 15, respectively (Griffin et al., 1972).

It is tempting to attribute the gains in proteolysis wholly to increased enzyme access resulting from both SH unmasking and increased substrate solubility. However, higher levels of surfactants (<0.5%) would be required to achieve this. In spite of surfactant concentration, significant increases in proteolytic activity were observed at low levels (0.05–0.4%) of surfactant. The rate of SH unmasking was not significant at these points. Hence, in addition to solubility mediated SH unmasking, a different mechanism of activation must be involved, particularly at low surfactant levels. Although the mechanism of action seems unclear, it is possible that surfactant lipids would provide sites for enzyme-substrate hydrophobic interaction. Since the SH groups of most cysteine proteinases are located in hydrophobic environments within the enzymes molecules, non-ionic surfactants would further enhance interaction with potential substrates.

The apparent Michaelis-Menten coefficients in Table 1 shows that for purposes of enhancing rumen proteinase function, Tween 80 would be preferred to Tween 60. Further to obtain the same activation rate (Vmax), much less Tween 80 would be needed compared to Tween 60 as is shown by a lower Km value for the former additive. Obviously, in vivo benefits would only be made if increased proteinase activity is coupled to significant increases in fibre fermentation and ultimately to enhanced nutrient digestibility.

Table 2 shows that both additives enhanced cellulose degradation rate compared to the control treatment. However, the effect due to Tween 80 was significantly greater than with Tween 60. Nonionic surfactants are widely used in industrial bioreactors, to enhance cellulose hydrolysis.

The effects of various levels of Tween 80 on the microbial enzyme source adsorption to finely ground straw are summarized in Table 3. Although 0.05–0.10% Tween 80 in the reaction mixture increased microbial enzyme source adsorption significantly ($P<0.05$), the effect was not additive at 0.25 or 0.50%. The adsorbing protein comprised of proteinases, cellulases, other enzymes and unlysed bacterial cells. However, the adsorption of cellulases usually parallels the rate of hydrolysis of cellulose. Hence, increased cellulase attachment at 0.5% Tween 80 may have contributed to the significantly higher rate of cellulase degradation shown in Table 7.

Table 4 shows the chemical composition of the hay fed to sheep in the trial designed to evaluate the effect of Tween 80 on intake and digestibility. A medium quality hay was used so that protein would not limit rumen function. As the results of this trial show (Table 5), Tween 80 enhanced feed intake and digestibility significantly compared to the control. There was a 5% and an 18% increase in intake and digestibility, respectively. It should be noted though that Tween 80 was included at about 0.3% in the ration. However, this was the Km concentration that is half the concentration that would elicit maximum microbial activity. Consequently, the resultant effect on digestibility would be lower than the potential.

The observed increased digestion efficiency noted above was also coupled to increased feed intake. Normally, increased feed intake is also associated with a more rapid digesta flow rate and a subsequent reduction in digestibility. That both intake and digestibility increased together, reflects the increased efficiency of the digestive enzymes, particularly in the rumen.

EXAMPLE 3

Carriers For Tween 80

The specific objective of this experiment was to select a carrier that will permit Tween 80 to be handled as a solid material rather than a liquid. In its natural form Tween 80 has a consistency similar to molasses and this causes concern over mixing, particularly in cold weather. Three carriers (approved for use in the feed industry) were identified and evaluated as outlined below.

The carriers were celite (Fisher Scientific Co. New Jersey, USA), diatomaceous earth (Sigma Chemical Co. St. Louis, Mo.) and LuctaCarrier (Lucta, S.A. Barcelona, Spain). Tween 80 was mixed with the carriers such that the resulting mixture contained 50% Tween 80 (wt/wt). The ability of Tween 80 in these mixtures to improve digestive efficiency was evaluated in vitro with orchardgrass hay that had been ground to pass through a 1 mm screen. Treatments included 0 (control), 0.1 and 0.2% liquid Tween 80, 0.1 and 0.2% Tween 80 in diatomaceous earth, 0.1 and 0.2% Tween 80 in celite, and 0.1 and 0.2% Tween 80 in LuctaCarrier. Appropriate quantities of each substrate were mixed with the additives and incubated in the Ankom in vitro system (Ankom Technology Fairport N.Y.) for 22 h.

In vitro true digestibility (IVTD) of orchardgrass hay was higher ($P<0.05$) in all treatments containing Tween 80 except the treatment containing 0.2% Tween 80 in LuctaCarrier. The IVTD values for control, and 0.1 and 0.2% Tween 80 in liquid form, 0.1 and 0.2% Tween 80 in LuctaCarrier, 0.1 and 0.2% Tween 80 in diatomaceous earth and 0.1 and 0.2% Tween 80 in celite were: 51.44; 54.20, 54.93; 53.64, 49.45; 54.91, 55.34; 54.41, 55.63%, respectively. These results indicate that all the carriers investigated were equally effective as a means of delivering the Tween 80. The results further indicate that 0.1% (wt/wt) Tween 80 may be as effective as 0.2% Tween 80 in increasing the extent of in vitro true digestibility of orchardgrass hay.

EXAMPLE 4

Addition of Tween 80 to a Total Mixed Ration (TMR) Based on Silage and Barley Grain Improves Milk Production in Dairy Cows One hundred and twenty cows and heifers in a dairy herd of Holsteins were divided into three treatment groups of 40 animals per group. All animals were given ad libitum access to a total mixed ration (TMR) based on grass silage, corn silage, grass hay, barley and canola meal. The treatments imposed were:

Treatment 1—TMR without additive (Control).
Treatment 2—TMR formulated to contain 0.2% (wt/wt) Tween 80+0.1% enzyme preparation (wt/wt).
Treatment 3—TMR formulated to contain 0.2% (wt/wt) Tween 80.

The Tween 80 was coated onto silica to form a product containing 50% Tween 80 and 50% silica. The enzyme preparation was obtained from Lucta S.A. (Barcelona, Spain). The preparation had the following activities: $\beta$-glucanase 263.0, xylanase 75.1 and amylase 542.6. Activities were expressed as nmol of reducing sugars released per mg of enzyme in 1 min at 0.83 mg/ml enzyme concentration. The trial lasted 13 weeks. Animals received their respective dietary treatments for 12 weeks. Milk production and feed intake were monitored until the 13th week (1 week after animals had been removed from dietary treatments).

Feed (TMR) offered to each group was weighed and recorded at each feeding. Each group was fed to provide a weighback of 5%. Samples of the feed offered and refused were taken daily, composited into weekly samples and dried at 55° C. for 72 hr to determine dry matter (DM) content. Daily (AM and PM) milk production by each cow was recorded. Animals were weighed two days in a row immediately after milking on a monthly basis. Milk samples were taken for compositional analyses (fat, protein, and somatic cells) in the week preceding the trial, and then during the trial at 4 week intervals. Samples were taken from both the AM and the PM milkings and analyzed individually.

Figure 4:
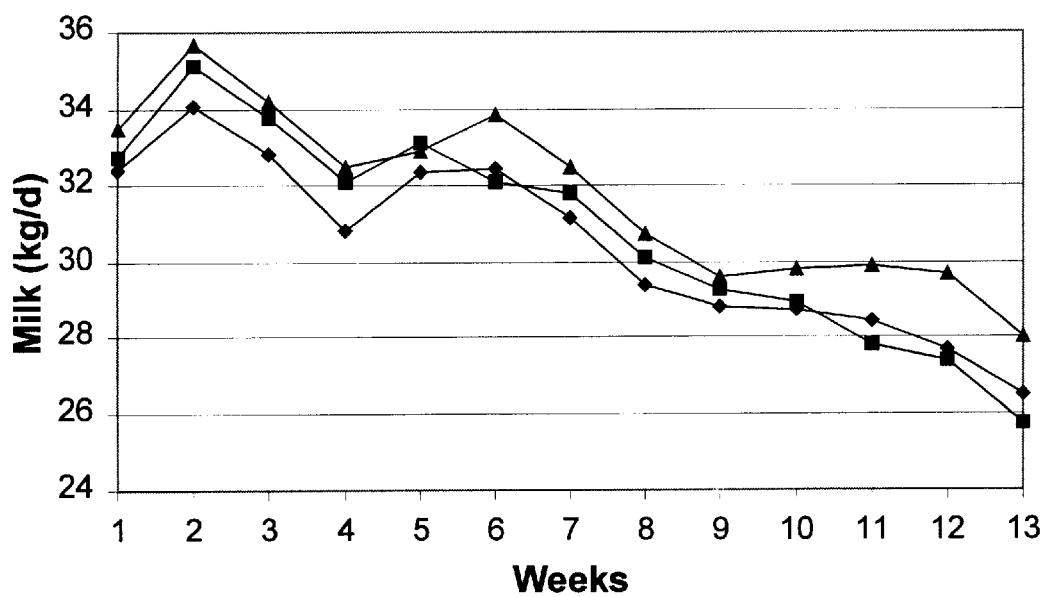
FIG. 4 is a graphical representation of the effect of the nonionic surfactant Tween 80 on milk production in mature dairy cows as described in Example 4.
Figure 5:
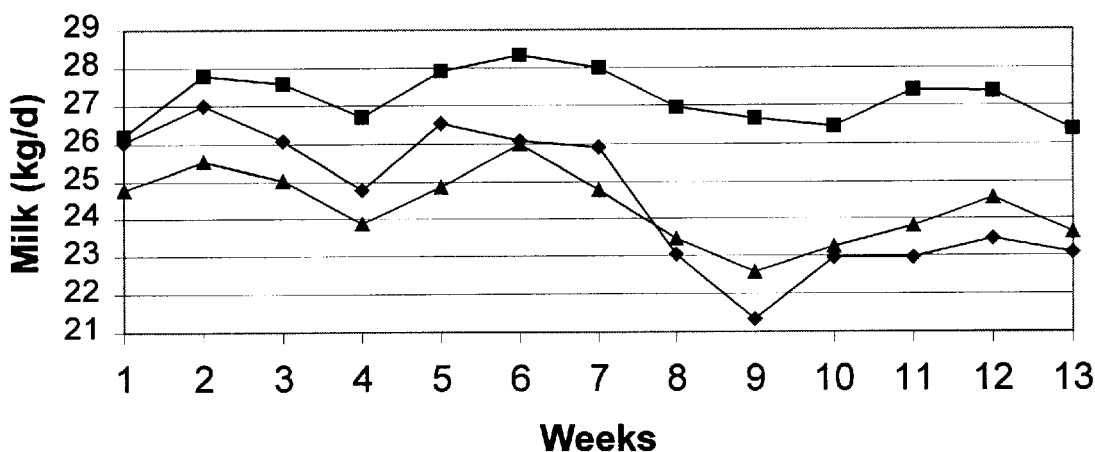
FIG. 5 is a graphical representation of the effect of the nonionic surfactant Tween 80 on milk production in heifers as described in Example 4.

The overall milk yield for cows that were lactating at least 3 weeks prior to the start of the trial is presented in FIG. 4. Milk production from cows that received the combination of Tween 80 plus enzyme treatment was higher than the controls at all times. The upper range of the difference was close to 2 kg/cow/day. The average increase was 0.96 kg/cow/day. Over the 12-week period when cows were on their respective dietary treatments, a cow on the Tween 80 plus enzyme treatment produced 81 kg more milk than a cow on the control treatment. Compared to the control treatment, milk production was also higher in cows that received the Tween 80 alone treatment. The average improvement in milk production from Tween 80 only over the trial was 0.76 kg/cow/day. On average, a cow on Tween 80 produced a total of 64 kg more milk during the 12-week period than a cow on the control diet. The average increase in production of mature cows on Tween 80 alone was 1.31 kg/day (FIG. 4). Over the 12 weeks of the trial, a mature cow receiving Tween 80 alone produced 110 kg more milk, than a cow on the control diet, and 74 kg more than a cow receiving the treatment containing Tween 80 plus enzyme. There was a much larger response to the Tween 80 plus enzyme combination in heifers (FIG. 5). This response increased as the trial progressed. Average increase in milk production in heifers receiving the combination of Tween 80 plus enzyme was 2.6 kg/day above that of controls.

Figure 6:
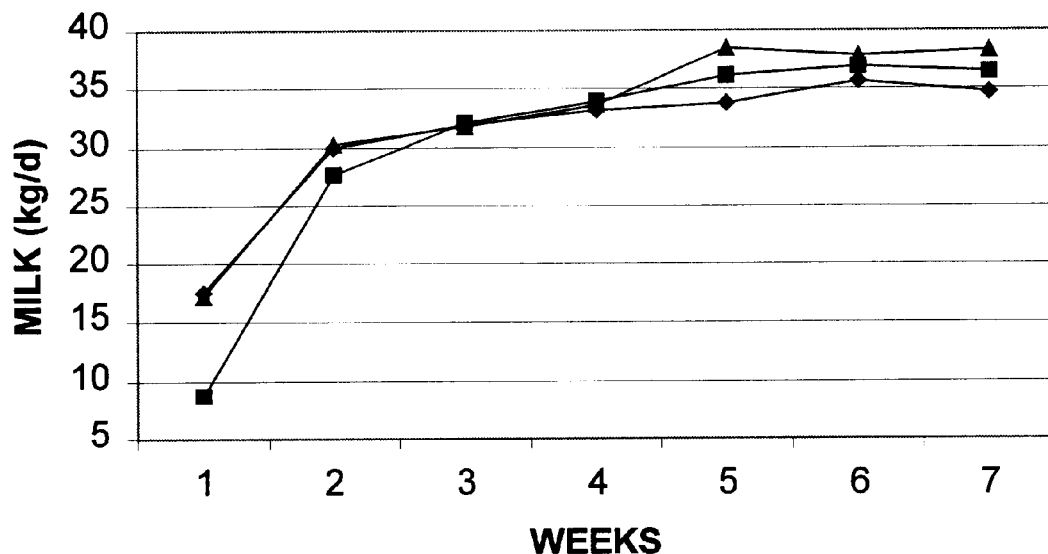
FIG. 6 is a graphical representation of the effect of the nonionic surfactant Tween 80 on milk production in fresh cows as described in Example 4.

FIG. 6 shows the response of fresh cows (7 animals per treatment group) to the dietary treatments. As indicated in the figure, there was apparently no response to the dietary treatments prior to the 4th week of lactation. After the 4th week, cows on the Tween 80 only treatment produced approximately 4 kg more milk/cow/day than cows on the control treatment. The respective response by cows on the combination of Tween 80 and enzyme treatment was 2 kg more milk/cow/day. The dietary treatments did not affect milk composition (fat and protein) and somatic cell counts.

Weight Gain

Feed conversion efficiency was higher in animals that received Tween 80 in their ration. Milk produced (kg) per kg of feed consumed was 1.37, 1.40 and 1.48 for animals on the control, Tween 80 plus enzyme, and Tween 80 only treatments, respectively.

The average daily gain in weight of animals on Tween 80 plus enzyme treatment was higher than that of animals on the control treatment. Weight gain of animals on the Tween 80 alone was similar to that of animals on the control diet. This indicates that the additional milk produced by animals on Tween 80 plus enzyme, and Tween 80 only treatments was not derived from body tissue. In terms of energetic efficiency these animals were obtaining more from the diet than those on the control treatment were.

EXAMPLE 5

Effect of Two Levels of Tween 80 on Milk Production and Feed Intake in Cows

Seventy-five dairy cows of the Holstein breed were ranked according to lactation number, days in milk and production level and placed into three equal groups. Treatments were then randomly assigned to individual animals within the groups. There were 25 animals in each dietary treatment group. Cows were offered ad libitum access to a total mixed ration (TMR) based on grass silage, corn silage, grass hay and a commercial dairy concentrate. The treatments consisted of:

Treatment 1—Control diet (TMR).
Treatment 2—TMR containing 0.2% (w/w) Tween 80, and
Treatment 3—TMR containing 0.3% (w/w) Tween 80.

The experiment lasted 12 weeks. All cows were fed the control diet during the first week. This period served as a pretrial week. Cows in each treatment group were then fed their experimental diets for ten weeks. Milk production and feed intake were, monitored from the first week (pretrial) until the 12th week (one week after the experimental diets were withdrawn).

Ambient temperatures exceeded 40° C. during weeks 10 and 11 of the experiment resulting in considerable heat stress in the cows. Milk production and feed intake data are discussed in the light of the heat stress.

Average milk production by all animals in each treatment group is depicted in FIG. 5. Prior to the incidence of heat stress, cows on the treatment containing 0.2% Tween 80 produced about 1.1 kg/day (3%) more milk than cows on the control diet. During the first week of the heat stress (week 10), milk production by cows on the control diet fell by an average of 13.6%, while that of cows on the Tween 80 treatments fell by about 11%. The drop in milk production increased to 31.9% in cows on the control diet during week 11, compared to 23.6% in cows that received 0.2% Tween 80, and 22% in cows that received 0.3% Tween 80.

Figure 7:
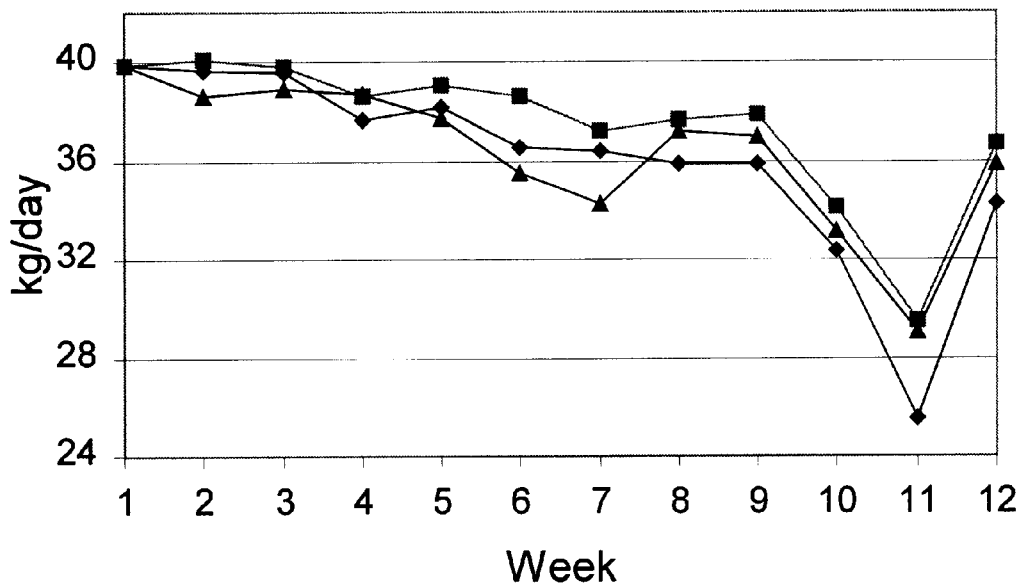
FIG. 7 is a graphical representation of the effect of the nonionic surfactant Tween 80 at 0.2% (w/w) and 0.3% (w/w) concentration levels on milk production in dairy cows as described in Example 5.
Figure 8:
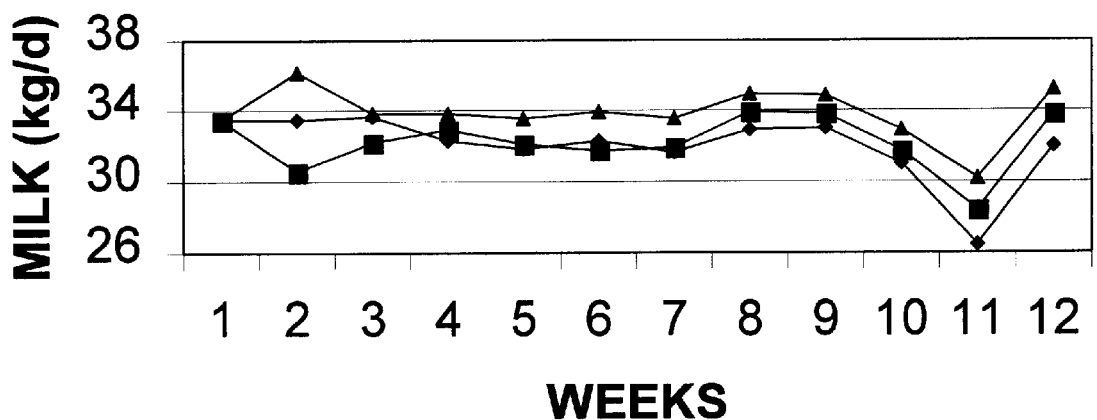
FIG. 8 is a graphical representation of the effect of the nonionic surfactant Tween 80 at 0.2% (w/w) and 0.3% (w/w) concentration levels on milk production in first calf heifers as described in Example 5.
Figure 9:
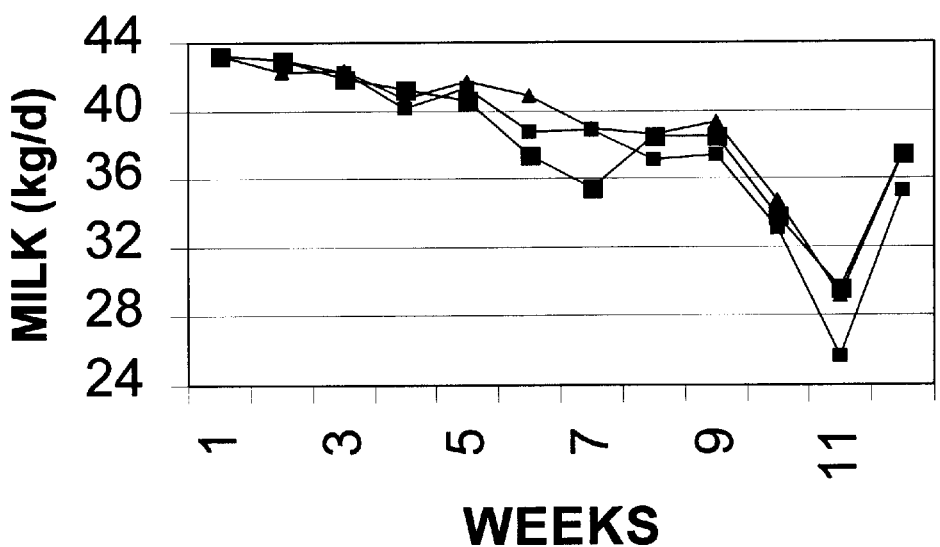
FIG. 9 is a graphical representation of the effect of the nonionic surfactant Tween 80 at 0.2% (w/w) and 0.3% (w/w) concentrations levels on milk production in mature cows as described in Example 5.

Milk production of first calf heifers in each treatment group that had calved at least 21 days prior to the start of the trial reveal that on average, animals on the dietary treatment containing 0.2% Tween 80 produced 2 kg/day more milk than animals on the control diet (FIG. 6). This number increased to more than 3.6 kg/day during the second week of heat stress, an increase of 13.6%. Mature cows (cows in second lactation or greater) on the treatment containing 0.2% Tween 80 produced 3.54 kg/day more milk on average and on the treatment containing 0.3% Tween 80 produced 3.98 kg/day more milk on average than animals on the control diet (FIG. 7).

Dry matter intake by cows on the control diet also fell by 17.4 and 30.3% during the first and second week of heat stress. The respective depressions in dry matter intake were 3.4 and 14.4% in cows on 0.2% Tween 80, and 6.0 and 12.6% in cows on 0.3% Tween 80. These results indicate the ability of Tween 80 to mitigate the effect of heat stress on feed intake and milk production.

Animals on the control treatment lost about 3.5 kg in weight during the first 30 d of the experiment and 1 kg during the last 60 d of the experiment. Cows on 0.2% Tween 80, however, gained 1 kg during the first 30 d and 9 kg during the last 60 days of the experiment. The respective weight gains in cows on 0.3% Tween 80 were 2.5 and 4.5 kg. This is an indication that the extra milk produced by these animals was not derived from mobilization of body reserves.

EXAMPLE 6

Effect of Tween 80 on Performance of Feedlot Cattle

Three hundred and twenty six Red Angus steers were stratified by weight and divided into eight pens. The pens were then randomly assigned to one of the following four dietary treatments:

1) control
2) 0.1% (wt/wt)Tween 80
3) 0.2% (wt/wt) glycanase enzyme (enzyme)
4) 0.01% Tween 80+0.2% enzyme.

The enzyme is marketed by GNC Bioferm Inc., Saskatoon, SK. The product contained the following activities (expressed as nmol of reducing sugars released from 1 mg of product per min: xylanase (336.6), β-glucanase (196.0), carboxymethylcellulase (44.4), and amylase (46.3). The basal diet was a total mixed ration consisting of rolled barley, corn silage and canola meal. Tween 80 was diluted with tap water (1 in 5) before it was applied. The total amount of feed required each day for the animals on each treatment was weighed separately in a mixer wagon and the appropriate quantity of Tween 80, enzyme, or their combination applied to it and mixed for ten minutes before feeding. An equal volume of water as applied to the Tween 80 treatment was also applied to the control and enzyme treatment to make the moisture content of the four experimental diets equal. The experimental diets were fed for a total of 119 days. Individual body weights were taken at the beginning and end of the experiment. Group body weights were taken at monthly intervals.

Overall body weight changes and feed efficiency in animals on each of the dietary treatments are indicated in Table 3.1 below. At the end of the 119 days, animals that consumed diets containing 0.1% Tween 80 had gained approximately 5.8% more weight than animals on the control diet. Average daily gain in these animals was 6.3% higher than in animals consuming the control diet. Feed efficiency was also better in animals on the 0.1% Tween 80 treatment.

TABLE 6

Average daily gain and feed efficiency in steers fed Tween 80 and enzyme for 119 days[1]

| Treatment[2] | Initial Body Weight (kg) | Total Weight Gain (kg) | Average Daily Gain (kg/d) | Feed Efficiency (Gain/Feed) |
| --- | --- | --- | --- | --- |
| Control | 422.98 | 207.03b | 1.59b | 0.160 |
| 0.1% Tween 80 | 427.97 | 219.03a | 1.69a | 0.166 |
| 0.2% Enzyme | 430.24 | 211.66b | 1.63ab | 0.163 |
| 0.01% Tween 80 + 0.2% Enzyme | 425.47 | 207.53b | 1.60b | 0.160 |

[1]Means in the same column with different superscripts differ (P < 0.05)
[2]Concentrations are on dry matter basis.

REFERENCES

1. Beauchemin, K. A. et al., "Fibrolytic enzymes increase fiber digestibility and growth rate of steers fed dry forages," *Can. J. Anim. Sci.* 75:641–644 (1995).
2. Castanon et al., "Effects of the surfactant Tween 80 on enzymatic hydrolysis of newspaper," *Biotechnol. & Bioeng.* 23:1365 (1981).
3. Cheng et al., "Microbial ecology and physiology of feed degradation within the rumen," in Physiological aspects of digestion and metabolism in ruminants: Proceedings of the seventh international symposium on ruminant physiology, Tsuda, Ed., 1991.
4. Feng, P. et al., "Effect of enzyme additives on in situ and in vitro degradation of mature cool-season grass forage," *J. Anim. Sci.* 70 (Suppl. 1): 309 (1992).
5. Forsberg, "Some Effects of Arsenic on the Rumen Microflora; An In Vitro Study," *Can. J. Microbiol.* 24:36 (1978).
6. Goering et al., "Forage fiber analysis," *Agric. Handbook* No. 379, p. 12 (1970).
7. Griffin et al., "Surface Active Agents," in *Handbook of Food Additives.* 2nd Ed., T. E. Furia, Ed., CRC Press, New York, N.Y., p 397 et seq. (1972).
8. Jouany, J. P, "Methods of manipulating the microbial metabolism in the rumen," *Ann. Zootech.* 43:49–62 (1994).
9. Mahadevan et al., "Preparation of protease from mixed rumen microorganisms and its use for the in vitro determination of true protein in feedstuffs," *Can. J. Anim. Sci.* 67:55 (1987).
10. Parkinson and Allen, "A wet oxidation procedure suitable for the determination of nitrogen and mineral nutrients in biological materials," *Comm. Soil Sci. Plant Anal.* 6:1 (1975).
11. Perry, T. W. et al., "Effects of supplemental enzymes on nitrogen balance, digestibility of energy and nutrients and on growth and feed efficiency of cattle," *J. Anim. Sci.* 25:760–764 (1966).
12. Rosen, "A Modified Colorimetric Analysis For Amino Acids," *Arch. Biochim. Biophys.* 67:10 (1957).
13. Sasago et al., "Determination of sulfhydryl and disulfide groups in milk by p-chloromercuribenzoate-diathizone method," *J. Dairy Sci.* 46:1348–1351 (1963).
14. Smith et al., "Measurement of protein using bicinchonic acid," *Anal. Biochem.* 150:76 (1984).
15. Svozil, B. et al., "Application of a cellulolytic preparation in nutrition of lambs," *Sbor. Ved. Praci. VUVZ Prhrelice* 22:69–78 (1989).
16. Uden et al., "Investigation of chromium, cerium and cobalt as markers in digesta: Rate of Passage studies," *J. Sci. of Food and Agriculture* 31:625–632 (1980).

17. Van Nevel, C. J. et al., "Manipulation of rumen fermentation," In: *The Rumen Microbial Ecosystem.* Ed. P. N. Hobson. Elsevier Applied Science London. Pp. 387 (1988).

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A feedstuff composition for enhancing milk production in ruminant animals comprising a feedstuff and from about 0.01 to 1% (w/w) of the dry weight of the feedstuff of a nonionic surfactant selected from the group consisting of polyoxyethylenesorbitan monooleate and polyoxyethylenesorbitan trioleate, wherein the nonionic surfactant is added to the feedstuff by coating the nonionic surfactant onto a solid particulate carrier and then adding the carrier to the feedstuff.

2. The composition of claim 1 wherein the nonionic surfactant comprises from about 0.01 to 0.3% (w/w/) of the dry weight of the feedstuff.

3. The composition of claim 1 wherein the solid particulate carrier is selected from the group consisting of celite, diatomaceous earth and silica.

4. The composition of claim 1 further comprising a digestion enhancing enzyme.

5. The composition of claim 1 further comprising a lactic acid bacteria inoculum.

6. A method of enhancing milk production by a ruminant animal, comprising adding to the feed of the animal from about 0.01 to 1% (w/w) of the dry weight of the feed of a nonionic surfactant selected from the group consisting of polyoxyethylenesorbitan monooleate and polvoxyethylenesorbitan trioleate wherein the nonionic surfactant is added to the feed by coating the nonionic surfactant onto a solid particulate carrier and then adding the carrier to the feed.

7. The method of claim 6 wherein the nonionic surfactant comprises from about 0.01 to 0.3% (w/w) of the dry weight of the feed.

8. The method of claim 6 wherein the solid particulate carrier is selected from the group consisting of celite, diatomaceous earth and silica.

9. The method of claim 6 which further comprises adding a digestion enhancing enzyme to the feed.

10. The method of claim 6 which further comprises adding a lactic acid bacteria inoculum to the feed.

\* \* \* \* \*

UNITED STATES PATENT AND TRADEMARK OFFICE
CERTIFICATE OF CORRECTION

PATENT NO. : 6,221,381 B1  
DATED : April 24, 2001  
INVENTOR(S) : J.A. Shelford et al.

Page 1 of 1

It is certified that error appears in the above-identified patent and that said Letters Patent is hereby corrected as shown below:

<u>Column 18,</u>  
Line 9, "polvoxyethylene-" should read -- polyoxyethylene- --

Signed and Sealed this

Eighth Day of January, 2002

*Attest:*

*Attesting Officer*

JAMES E. ROGAN  
*Director of the United States Patent and Trademark Office*